(12) United States Patent
Lin

(10) Patent No.: US 6,932,066 B1
(45) Date of Patent: Aug. 23, 2005

(54) ENGINE'S CYLINDER HAVING A LAYER COATED WITH NANO-GOLD AND NANO-TITANIUM TO THE INNER WALL THEREOF

(76) Inventor: Yung-Sheng Lin, No. 19, Lane 166, Tzu Hang Road, I-Lan City, I-Lan Hsien (TW)

( * ) Notice: Subject to any disclaimer, the term of this patent is extended or adjusted under 35 U.S.C. 154(b) by 0 days.

(21) Appl. No.: 10/957,662

(22) Filed: Oct. 5, 2004

(51) Int. Cl.[7] .......................... F02B 75/08; F02B 75/12
(52) U.S. Cl. ....................... 123/668; 123/1 A; 123/670
(58) Field of Search ............................ 123/1 A, 668, 123/670; 44/354

(56) References Cited

U.S. PATENT DOCUMENTS 5,693,106 A * 12/1997 Peter-Hoblyn et al. ....... 44/301

* cited by examiner

Primary Examiner—Noah P. Kamen
(74) Attorney, Agent, or Firm—Rosenberg, Klein & Lee

(57) ABSTRACT

An engine's cylinder having a layer coated with nano-gold and nano-titanium to the inner wall thereof. An excellent catalysis can be achieved due to the fine structure and the surface effect of the nano-gold and the nano-titanium as catalyst.

4 Claims, 2 Drawing Sheets

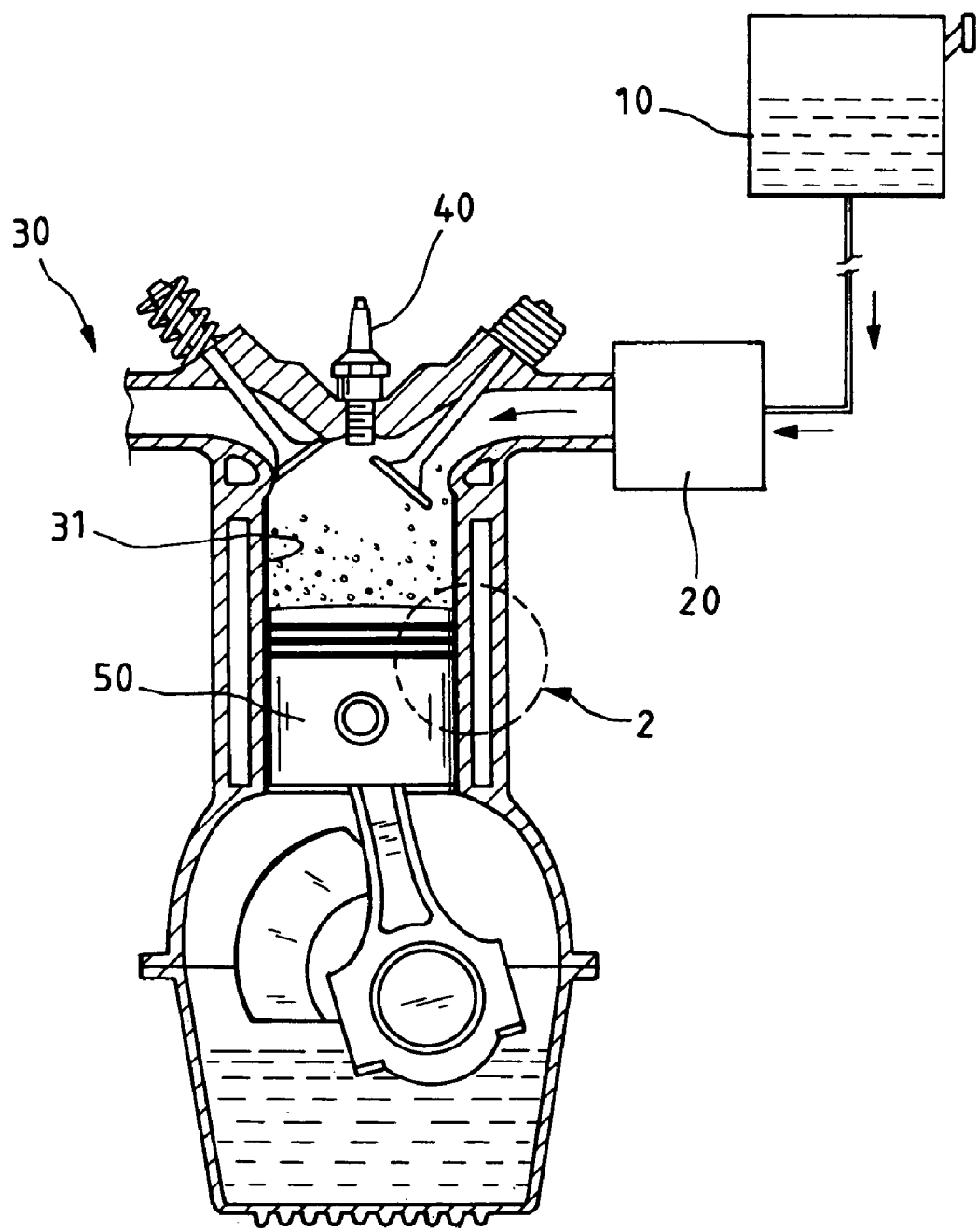
F I G. 1

ENGINE'S CYLINDER HAVING A LAYER COATED WITH NANO-GOLD AND NANO-TITANIUM TO THE INNER WALL THEREOF

BACKGROUND OF THE INVENTION

1. Field of the Invention

The invention relates to an engine's cylinder, and more particularly to an engine's cylinder having a layer coated with nano-gold and nano-titanium to the inner wall thereof. An excellent catalysis can be achieved due to the fine structure and the surface effect of the nano-gold and the nano-titanium as catalyst. This ensures a desirable increase of the engine's output efficiency, a chemical conversion of poisonous wastes like carbon-monoxide (CO) and nitrogen oxides ($NO_x$) to non-poisonous carbon-dioxide ($CO_2$) nitrogen ($N_2$) and oxygen ($O_2$), respectively, and an effective reduction of temperature within the cylinder.

2. Description of the Related Art

It's inevitable for the internal combustion engine to produce incomplete combustion due to the structural factors in use of gasoline, diesel or machine oil, lubricants. This results in increase of fuel consumption and reduction of horse power. Meanwhile, more poisonous gas emissions arise so that environment pollution becomes more and more serious. In addition, a high temperature is created in the combustion process, and this will negatively affect the engine's service life.

Gas emissions from the engine after combustion contain a bad smell which is hardly endurable by people. However, solutions thereto have been lacking for a long period.

Nano-structure has been valued recently. That the lotus can't be contaminated even coming from silt is due to nano-structure of its surface. The silt is not attached to its surface, and drops of water roll over its surface and won't be scattered. With the development of the new technology, artificial nanostructure materials have been developed, and the nanostructure will bring us into a new nano-age. For example, copper is a conductor while the nano-copper is however a non-conductor. The activity between micron and nano scale photocatalyst reaches 1000-times difference due to surface area difference. Therefore, the application of the nanostructure is a new continent for human beings.

SUMMARY OF THE INVENTION

It is a primary object of the invention to provide an engine's cylinder having a layer coated with nano-gold and nano-titanium to the inner wall thereof for enhancing the engine's output efficiency.

It is another object of the invention to provide an engine's cylinder having a layer coated with nano-gold and nano-titanium to the inner wall thereof for converting the poisonous wastes like carbon-monoxide (CO), nitrogen oxides ($NO_x$), into non-poisonous gases for reducing air pollution.

It is a further object of the invention to provide an engine's cylinder having a layer coated with nano-gold and nano-titanium to the inner wall thereof for reducing the combustion temperature within the cylinder, thereby raising the engine's service life.

It is still another object of the invention to provide an engine's cylinder having a layer coated with nano-gold and nano-titanium to the inner wall thereof for a sterilizing and a deodorizing effect.

BRIEF DESCRIPTION OF THE DRAWINGS

The accomplishment of this and other objects of the invention will become apparent from the following descriptions and its accompanying drawings of which:

FIG. 1 is a schematic drawing of an internal combustion engine in accordance with the invention;

DETAILED DESCRIPTION OF THE PREFERRED EMBODIMENT

Figure 2:
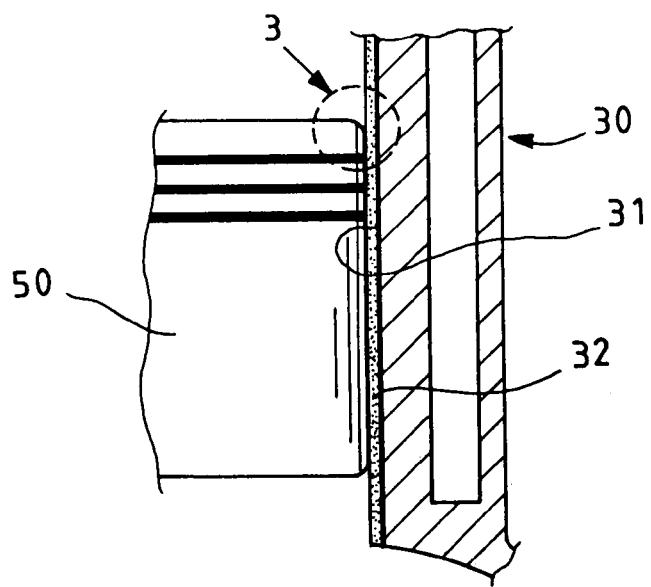
FIG. 2 is a partially enlarged view of FIG. 1.

First of all, referring to FIG. 1, gasoline or diesel is injected from a fuel tank 10 through a carburetor 20 into the cylinders or combustion chambers of an engine 30. The fuel-and-air mixture is sparked by a spark plug and burnt in a cylinder 31 for driving a piston 50 in up-and-down motion.

It has been discovered by experiments that nano-gold solution and nano-titanium solution can be combined to fill in the fuel tank 10. The mixture of them with fuel is injected through the carburetor 20 into the engine 30 for combustion. The nano-particles of gold have an excellent catalyzing effect both on the conversion of carbon-monoxide (CO) to carbon-dioxide ($CO_2$) and for the reduction of nitrogen oxides ($NO_x$) to nitrogen ($N_2$) and oxygen ($O_2$). Due to the thermodynamic behavior of nano-sized gold, the melting point of nanometal can be lowered for effectively reducing the sintering temperature. Accordingly, the addition of the nano-gold solution and the nano-titanium solution to the fuel can catalyze all kinds of chemical reactions and reduce the temperature of engine.

The nano-gold solution consists of diethylbenzene, molybdenum disulfide, and nanoparticles of gold with a concentration of 500–5000 ppm. And the nano-titanium solution consists of titanium dioxide and water. Titanium dioxide acts originally as catalyst for reducing the energy of chemical reactions and for enlarging the chemical reactions. In combination of the titanium dioxide with nano-gold, the effect is more evident. Furthermore, a sterilizing and a deodorizing effect can be achieved.

As shown in FIG. 2, the inner wall of the cylinder 31 will be coated with a titanium-gold layer 32 by the reciprocating motion of the piston 50 after injection of nano-sized gold-titanium solution into the engine. The formation of the titanium-gold layer 32 provides not only a protection to the cylinder 31 but also a catalysis to the combustion process. This allows a reduction of nitrogen oxides ($NO_x$) to nitrogen ($N_2$) and oxygen ($O_2$) for facilitating the combustion process, thereby increasing the output efficiency of the engine, reducing poisonous gas emissions and raising the engine's service life.

Figure 3:
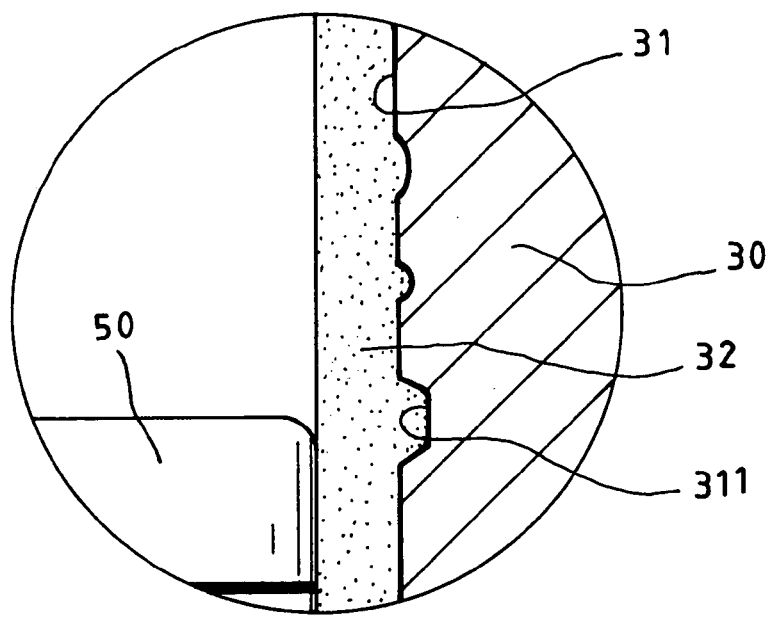
FIG. 3 is a partially enlarged view of FIG. 2.

Furthermore, as shown in FIG. 3, the gradual formation of the titanium-gold layer 32 allows a complete filling in recesses 311 on the surface of the cylinder 31, thereby sealing the gap between the piston 50 and the cylinder wall. In this way, the performance of torsion and the uphill power can be raised.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An internal combustion engine comprising:
   a) an engine's cylinder; and
   b) a layer coated with nano-gold and nano-titanium to the inner wall of the engine's cylinder.

2. The internal combustion engine as recited in claim 1 wherein the nano-gold is made of diethylbenzene, molybdenum disulfide, and nanoparticles of gold with a concentration of 500–5000 ppm.

3. The internal combustion engine as recited in claim 1 wherein the nano-titanium is made of titanium dioxide.

4. A method for forming a nano-sized titanium-gold-layer onto an engine's cylinder, the method comprising the steps of:
   a) adding nano-gold solution and nano-titanium solution to a fuel tank wherein the nano-gold solution consists of diethylbenzene, molybdenum disulfide, and nanoparticles of gold with a concentration of 500–5000 ppm while the nano-titanium solution consists of titanium dioxide and water;
   b) injecting the mixture of the nano-gold solution and the nano-titanium solution together with fuel within the fuel tank through a carburetor into a combustion chamber within an engine for combustion; and
   c) forming a titanium-gold layer onto the inner wall of the cylinder by the reciprocating motion of a piston within the engine after injection of nano-sized gold-titanium solution thereinto.

* * * * *